US011963538B2

(12) United States Patent
Szczygiel et al.

(10) Patent No.: US 11,963,538 B2
(45) Date of Patent: Apr. 23, 2024

(54) DOUGH WITH CONTROLLED FERMENTATION FOR USE IN FORMING LEAVENED DOUGH PRODUCTS

(71) Applicant: Board of Trustees of Michigan State University, East Lansing, MI (US)

(72) Inventors: Edward J. Szczygiel, Ypsilanti, MI (US); Kaylan Hayman, Griffin, GA (US); Karl Seiwert, Perrysburg, OH (US); Ran Tao, Freemont, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 562 days.

(21) Appl. No.: 17/078,867

(22) Filed: Oct. 23, 2020

(65) Prior Publication Data
US 2021/0120828 A1  Apr. 29, 2021

Related U.S. Application Data

(60) Provisional application No. 62/926,087, filed on Oct. 25, 2019.

(51) Int. Cl.
| A21D 8/04 | (2006.01) |
| A21D 6/00 | (2006.01) |
| A21D 10/02 | (2006.01) |
| A21D 13/31 | (2017.01) |
| A21D 13/44 | (2017.01) |

(52) U.S. Cl.
CPC .............. *A21D 8/045* (2013.01); *A21D 6/001* (2013.01); *A21D 10/025* (2013.01); *A21D 13/31* (2017.01); *A21D 13/44* (2017.01)

(58) Field of Classification Search
CPC ...... A21D 13/44; A21D 6/001; A21D 10/025; A21D 8/045; A21D 13/31
USPC .......................................................... 426/18
See application file for complete search history.

(56) References Cited

U.S. PATENT DOCUMENTS 9,681,671 B2 *  6/2017  Domingues ............ A21D 2/265

FOREIGN PATENT DOCUMENTS

EP  504970 A2 *  9/1992  ........... A21D 10/005

OTHER PUBLICATIONS

Chia-Jenn Wei et al—Effect of Sodium Chloride on Bakers' Yeast Growing in Gelatin; Applied and Environmental Microbiology, 43:757-763.; Apr. 1982; downloaded Jan. 22, 2021.
Federal Trade Commission. (Nov. 2003). Slotting Allowances in the Retail Grocery Industry: Selected Case Studies in Five Product Categories; https://www.ftc.gov/sites/default/files/documents/reports/use-slotting-allowances-retail-grocery- industry/slottingallowancerpt031114.pdf, downloaded Jan. 22, 2021.
AYUCITRA. (2012). Preparation and Characterisation of Acetylated Corn Starches. International Journal of Chemical Engineering and Applications. 156-159. doi: 10.7763/IJCEA.2012.V3.178; downloaded Jan. 22, 2021.
Paperboard Packaging Alliance. About paperboard packaging; https://paperboardpackaging.org/about-paperboard-packaging; downloaded Jan. 22, 2021.
Marketing Charts. (2016). How do US teens hear about new brands ?; https://www.marketingcharts.com/industries/media-and-entertainment-66496; downloaded Jan. 22, 2021.
Godfray H.C.J., Aveyard P., Garnett T., et al. (Jul. 2018). Meat consumption, health, and the environment. Science 361(6399). doi: 10.1126/science.aam5324; downloaded Jan. 22, 2021.
TIC Gums. How to Disperse Gums in Water, https://www.ticgums.com/news-a-events/gum-guru-blog/1398-how-to-disperse-gums-in-water.html; downloaded Jan. 22, 2021.
The Boyd Company Inc. Comparative Food and Beverage Processing Industry Operating Costs; http://pennsnortheast.com/images/uploads/PNE_Boyd_Food_Processing_Industry_Cost_Report_060617.pdf; downloaded Jan. 22, 2021.

* cited by examiner

*Primary Examiner* — Subbalakshmi Prakash
(74) *Attorney, Agent, or Firm* — Howard & Howard Attorneys PLLC

(57) ABSTRACT

A yeast-containing dough that is used to form a leavened dough product having a desired degree of leavening is initially formed as two separate dough subcomponents that, when combined, leavens through a fermentation reaction process to form a dough having the desired degree of leavening. The first dough subcomponent includes a leavening activator, flour, salt and water, while the second dough component includes a biological leavening agent, flour, and water. When combined, the leavening agent reacts in the presence of the biological leavening activator through a fermentation process to form the dough having a desired degree of leavening, which can then be heated to a temperature exceeding a viability temperature of the leavening activator to terminate the fermentation process and form the leavened dough product. The dough can also be combined with at least one non-dough component to form the leavened dough product.

8 Claims, No Drawings

DOUGH WITH CONTROLLED FERMENTATION FOR USE IN FORMING LEAVENED DOUGH PRODUCTS

CROSS-REFERENCE TO RELATED APPLICATIONS

The subject application claims priority to and all the benefits of U.S. Provisional Patent Application No. 62/926,087, filed on Oct. 25, 2019, the disclosure of which is hereby incorporated by reference.

BACKGROUND OF THE INVENTION

1. Field of the Invention

The present invention relates generally to dough for use in forming a leavened dough product and, more particularly, relates to a dough with controlled fermentation for use in forming leavened dough products.

2. Description of the Related Art

In 2018, the frozen food market generated roughly $11 billion in sales, and international cuisine accounted for about $12 million of that (Statista, 2019—Retail Sales of Ethnic Foods in the United State in 2013 and 2018—http://www-.statista.com/statistice/324422/us-retail-sales-of-ethnic-foods). In a 2018 study conducted by Mintel (Mintel, 2018. International Food Trends—U.S. Mintel Reports Database), 20% of consumers aged 18-34 have tried a meal kit delivery service, and 65% of those people would like to see the same meal format on grocery store shelves. The Mintel study also indicated that 40% of meal kit consumers who would like to see more international cuisine featured in meal kits (Mintel 2018).

Pre-made yeast-containing doughs used for making many leavened dough products such as bao (a Chinese steamed bun), dumplings, or pancakes are examples of foods that can be included in meal kits and could fall under the category of international cuisine. Such doughs are typically packaged as a single frozen dough ball that is thawed by a user for use. The single frozen dough ball leavens the dough through a fermentation reaction process as the frozen dough is thawed. This dough having the desired degree of leavening can then be further processed to form leavened dough products such as bao, dumplings or pancakes as described above.

Because the dough is provided as a single ball, the fermentation process of the combined leavening agents begins as soon as the dough ball begins to thaw. Accordingly, it is difficult to control the degree of leavening prior a heat processing step in which the fermentation process is terminated, and the leavened dough ball is formed into the desired dough product. This is particularly problematic where a low degree of leavening in the desired leavened dough product is desired, such as when the leavened dough product is in the form a dumpling or a pancake. Further, should the user get delayed when preparing the dough ball into the desired leavened dough product, the degree of leavening may be too great for its intended purpose.

The present disclosure addresses some of these issues.

SUMMARY OF THE INVENTION

The present disclosure relates to a dough that is used to form a leavened dough product having a desired degree of leavening.

The dough is initially formed as two separate dough subcomponents that, when combined, leavens through a fermentation reaction process to form the resultant dough having the desired degree of leavening. In particular, the dough includes a first dough subcomponent comprising a biological leavening activator, flour, salt and water. In addition, the dough also includes a second dough subcomponent that is combined with the first dough component, with the second dough component comprising a leavening agent, flour, and water. When the first dough subcomponent is combined with the second dough subcomponent, the leavening agent reacts in the presence of the biological leavening activator through a fermentation process to form the dough having a desired degree of leavening.

In certain embodiments, the biological leavening activator is yeast, and the leavening agent is sugar. In these embodiments, the sugar is converted into an alcohol (typically ethanol) and carbon dioxide and releases energy.

In certain embodiments, the first and second dough subcomponents can be stored before use. By forming the respective first and second dough subcomponents as separate subcomponents and storing the separate subcomponents in an uncombined state before use, the fermentation process that creates the leavening within the dough can be delayed until a user combines the first and second dough subcomponents.

Still further, the separation of the dough into first and second dough subcomponents allows the separate subcomponents to be stored in a frozen state prior to use, with the frozen storing and the separation of the dough into two separate stored subcomponents performed to minimize yeast metabolism during the freezing or thawing process and maximize yeast activity after the freezing and thawing process.

The present disclosure also relates to an associated method for forming the dough and associated leavened dough products, including leavened dough products such as dumplings, pancakes or bao, wherein the dough may be heat processed into the leavened dough product and optionally combined with at least one non-dough component. In certain embodiments, the at least one non-dough component is selected from a group consisting of a filling product and a sauce product.

The present disclosure is also directed to meal kits that include the first and second dough subcomponents separately packaged along with the at least one non-dough product as described above.

Other features and advantages of the present invention will be readily appreciated, as the same becomes better understood, after reading the subsequent description taken in conjunction with the accompanying drawings.

DETAILED DESCRIPTION OF THE INVENTION

The present disclosure relates to a dough, and in particular a yeast-containing dough, that is used to form a leavened dough product having a desired degree of leavening. Even more particularly, the present disclosure relates to a dough that delays fermentation until a user requires leavening.

The delay in fermentation is achieved by having two separate dough subcomponents that are combined by the user at the time of use to form the dough. The first dough subcomponent includes a biological leavening activator such as yeast, while the second dough subcomponent includes a leavening agent, typically sugar. When the first and second dough subcomponents are combined to form a dough, the leavening agent reacts in the presence of the biological leavening activator through a fermentation process to provide the dough with a desired degree of leavening. Once the dough has the desired degree of leavening, the dough can then undergo a heat processing step, in which the dough is heated to a temperature exceeding a viability temperature of biological leavening activator to terminate the fermentation process, thereby preventing the further leavening of the heat processed dough. The degree of leavening in the dough is therefore dependent primarily upon the amount of time between which the two dough subcomponents are combined and wherein the combined dough is heat processed to terminate the fermentation process and form a leavened dough product such as bao, a pancake, or a dumpling. Notably, because biological leavening activator and leavening agent are provided in separate dough subcomponents, which are typically formed and then stored in a frozen state for a period of time prior to use, the fermentation process associated with the leavening of the dough cannot begin until the two dough subcomponents are combined (and if frozen, after being thawed and combined). Accordingly, the timing, and degree of leavening, can be more precisely controlled as compared with prior art dough products in which the dough is provided in a frozen state as a single dough product having both the first and second leavening agents.

The present disclosure also related to an associated method for forming and storing of the dough subcomponents prior to use, and in forming the associate dough when the dough subcomponents are combined.

The present disclosure is also directed to leavened dough products such as bao, pancakes or dumplings that can be formed from the dough after combining the first and second dough subcomponents. Such leavened dough products, in certain embodiments, can include at least one non-dough component, described below as a pair of non-dough components selected from a filling product and a sauce product, and combinations thereof, that are either incorporated into the leavened dough product during the processing, or used by a user in combination with the leavened dough product after processing, as will be described in further detail below.

The present disclosure is also directed to prepackaged meal kits that include the first and second dough subcomponents and optionally include the non-dough components preformed and stored in separate compartments of a container, typically in a frozen state.

First Dough Subcomponent

The first dough subcomponent includes a biological leavening activator, flour, salt and water.

The flour, which as provided herein is a wheat-based flour, contains a pair of proteins called gliadin and glutenin. When water is added to the flour and mixed, the gliadin and glutenin combine to form a new protein called gluten. Gluten molecules arrange themselves into chains that can be quite long and elastic to form the dough. The more you mix the flour and water mixture, such as through kneading, the more elastic it gets. In certain embodiments, a combination of all-purpose flour (which is a mixture of hard and soft wheat and typically has about 8 to 11 percent of gluten and a protein content of approximately 10 to 12 percent) and pastry flour (which is a soft wheat flour having protein content generally in the range of 7 to 9 percent) may be utilized in the first dough subcomponent. The term "hard wheat", as utilized herein, refers to wheat grain that is high in protein and gluten, while the term "soft wheat" refers to wheat grain which is lower in protein and contains more starch.

In certain embodiments, the amount of flour and water comprises approximately 80 to 90% by weight based on the total weight of the first dough subcomponent. The relative ratio of flour to water in the first dough component may vary, but typically ranges from about 4-6 parts by weight of flour to about 3 parts by weight of water, and more typically about 5 parts by weight flour to about 3 parts by weight of water, so as to form a workable dough product.

The term "leavening", as utilized herein, refers to the expansion of the dough within the dough's porous structure from the reaction of the leavening agent (including in the second dough subcomponent, as described below) in the presence of the leavening activator, which is included in the first dough subcomponent to produce a gas.

In the embodiments provided herein, the biological leavening activator is yeast, and in certain further embodiments the biological leavening activator is dry active yeast. Dry active yeast is granular and must be activated (i.e., proofed), by dissolving in warm water, such as water at approximately 105 degrees Fahrenheit. In other embodiments, yeasts that do not have to be activated can be used in combination, or in place of, the preferred dry active yeast as the biological activator provided herein.

In certain embodiments, the amount of biological leavening activator in the first dough subcomponent ranges from about 1 to 10 weight percent, such as from 2 to 5 weight percent, such as from 3 to 4 weight percent, based on the total weight of the first dough subcomponent.

The first dough subcomponent also includes salt. Salt is included in the first dough component to minimize metabolism of the biological leavening activator in the first dough subcomponent. In particular, when the biological leavening activator is yeast, the salt minimizes yeast metabolism. In addition, the inclusion of salt acts as a flavor enhancer for the subsequently formed leavened dough product. Accordingly, the salt used in the first dough subcomponent must be a salt that is fit for human consumption, typically table salt (i.e., sodium chloride) or sea salt.

The concentration of salt in the first dough subcomponent is sufficient to minimize metabolism of the biological leavening activator in the first dough subcomponent but is insufficient to terminate fermentation ability or affect viability of the biological leavening activator in the first dough subcomponent to allow for the first leavening agent to react with the leavening agent to create the leavening effect in the dough as will be described further below. Further the concentration of salt in the first dough subcomponent, while sufficient to enhance flavor in the leavened dough product, is not so great so as to provide the leavened dough product with a salty taste.

The term "minimize metabolism", as described herein, refers to the ability of the salt to limit the leavening agent's fermentation ability. In particular, because the cell wall of yeast is semi-permeable, the addition of salt to the first dough component in proximity to the biological leavening activator such as yeast will cause the cell to release water. Because this water is necessary for its cellular activities, releasing the water will slow down the reproduction and fermentation activities of the biological leavening agent, and hence will reduce its fermentation ability of the biological leavening activator in the first dough component. When the concentration of salt decreases, such as when the first and second dough subcomponent combines to form the dough as described in further detail below, the water level will increase within the cell, and the reproduction and fermentation activities of the biological leaving agent will correspondingly increase towards its normal fermentation activity in the absence of salt.

The term "viability", as it relates the "biological leavening agent viability" or "yeast viability", refers to the biological leavening agent being alive or dead. The viability of a biological leavening activator cell, such as a yeast cell, in increasing salt concentrations is limited. In particular, when the biological leavening activator is yeast, certain strains of yeast can remain viable in salt concentrations of up to 10% based on the total weight of the first dough subcomponent. As such, there is a practical limit of 10% by weight of salt in the first dough subcomponent to ensure that the biological leavening activator, and in particular the yeast cell, remains viable to allow for fermentation to occur when the first dough subcomponent is combined with the second dough subcomponent, as described below.

Even still further, the concentration of salt in the dough, which is formed by combining the first and second dough subcomponents, is such that the biological leavening activator metabolism, such as yeast metabolism, is substantially returned to its normal fermentation activity (in the absence of salt), thereby allowing the leavening agent to react in the presence of the biological leavening activator via the fermentation process as described above and further below.

In certain embodiments, the concentration of salt in the first dough subcomponent is from 2.5% to 10% by weight based on the total weight of said first dough subcomponent, such as from 2.8% to 5% by weight, such as from 3.0 to 3.5%.

The first dough subcomponent also includes one or more additional ingredients or additives to provide the first dough subcomponent with a desired physical property enhancement or aesthetic. Most typically, the first dough subcomponent may include a dough conditioner such as ascorbic acid. In addition, because the first dough subcomponent is typically frozen, an oil such as canola oil may be included that functions as a freezer burn protector. Additional additives commonly found in frozen dough products are also contemplated.

In alternative embodiments, in addition to or in place of the biological leavening activator, a chemical leavening activator such as baking soda or baking powder can be included in the first dough subcomponent. Such chemical leavening agents, if present, work in a similar manner to the biological leavening activator, in that the leavening agent reacts in the presence of the chemical leavening activator to produce the leavening effect in the dough matrix.

Second Dough Subcomponent

The second dough subcomponent includes a leavening agent, flour, and water.

The flour included in the second dough component is similar in formulation to the flour included in the first dough component above. In certain embodiments, a combination of all-purpose flour and pastry flour may be utilized in the second dough subcomponent. In certain embodiments, the amount of flour and water comprises approximately 80 to 90% by weight based on the total weight of the second dough subcomponent. The relative ratio of flour to water in the second dough component may vary, but typically ranges from about 4-6 parts by weight of flour to about 3 parts by weight of water, and more typically about 5 parts by weight flour to about 3 parts by weight of water, so as to form a workable dough product.

In the embodiments provided herein, the leavening agent is a substance that reacts in the presence of the biological leavening activator through a fermentation process when said first dough subcomponent is combined with said second dough subcomponent. In certain embodiments, the reaction of the leavening agent produces a gas, such as carbon dioxide, which causes expansion within the dough's porous structure and provide the leaving effect. The amount of gas created defines the degree of leavening in the dough.

In certain embodiments, the leavening agent is sugar, and the reaction of the sugar in the presence of the biological leavening activator through an alcohol fermentation process forms an alcohol (typically ethanol) and carbon dioxide which forms bubbles within the dough matrix that expand as the relative amount of carbon dioxide gas increases.

In certain embodiments, the amount of the leavening agent in the second dough subcomponent ranges from about 0.5 to 10 weight percent, such as from 0.8 to 3 weight percent, such as from 1 to 2 weight percent, based on the total weight of the second dough subcomponent.

The second dough subcomponent also includes one or more additional ingredients or additives to provide the first dough subcomponent with a desired physical property enhancement or aesthetic. Most typically, the second dough subcomponent may include a dough conditioner such as ascorbic acid. In addition, because the second dough subcomponent is typically frozen, an oil such as canola oil may be included that functions as a freezer burn protector. Still further, the second dough subcomponent may also include salt. Additional additives commonly found in frozen dough products are also contemplated.

Dough and Leavened Dough Product formed from First and Second Dough Subcomponents To form the dough, the first and second dough components are combined. Typically, this occurs by allowing the doughs to thaw, at which point the first and second dough components are combined and worked together for a sufficient period of time to combine to evenly distribute the respective ingredients. When combined, the concentration of salt in the dough will be reduced as compared with the concentration of salt in the first dough subcomponent. This in turn will allow the biological leavening activator metabolism to increase towards its normal fermentation activity (in the absence of salt), thereby allowing the leavening agent to react in the presence of the biological leavening agent via the fermentation process to create leavening within the resultant dough, a process referred to as proofing.

The fermentation reaction of the leavening agent in the presence of the leavening activator is biological process which occurs within the biological activator to produce ethanol and carbon dioxide from the breakdown of sugar. Accordingly, while the present disclosure recites that the leavening agent "reacts in the presence" of the leavening agent, the biological leavening activator, such as yeast, consumes the leavening agent, such as sugar, and breaks down the leavening agent to produce gas (i.e., creates the desired leavening effect in the dough). The biological activator then excretes the produced gasses to create the leavening effect and to do that, the leavening activator must be metabolically active. Thus, as described herein, the term "reacts in the presence of" specifically includes processes that include the consumption and excretion steps occurring as a result of the interaction of the leavening agent and the biological leavening activator, and thus are specifically contemplated in the description wherein the leavening agent reacts in the presence of the biological leavening activator as provided herein.

In certain embodiments, the concentration of salt in the dough, which is formed by combining the first and second dough subcomponents, is between 0 and 3 weight percent, such as from 0.5 to 2.5 weight percent, such as from 1 to 2 weight percent, based on the total weight of the dough.

The degree of leavening in the dough from the first and second dough subcomponents at a given temperature is a function of the time in which the combined dough is allowed to continue the fermentation process prior to a heat process termination step. To form a dough from the first and second dough subcomponents having a low degree of leavening, a short amount of time before heat processing is utilized. Conversely, to form a dough having a higher degree of leavening from the first and second dough subcomponents, a longer period of time is utilized. Degrees of leavening can be quantified in terms of percent expansion of the dough, in terms of the resultant density of the foam, and/or in terms of the amount of exhaustion of the second leavening agent (here the amount of sugar reacted to produce the carbon dioxide gas).

Doughs having a short proofing time, and thus a small degree of leavening, are ideally suited for forming leavened dough products such as dumplings or pancakes. In contrast, doughs having a longer proofing time, and hence a larger degree of leavening, are ideally suited for forming leavened dough products such as bao (a Chinese steamed bun).

When the dough has reached a desired degree of leavening as determined by the user, the dough is then heat processed to form a leavened dough product. The heat processing step is a process in which the temperature of the dough is increased to a temperature above the viability temperature of the biological leavening agent. Once the biological leavening agent dies, its fermentation activity is terminated, and the leavening agent is no longer reacted in the presence of the biological leavening agent to produce a further leavening effect.

Non-Dough Product

In certain embodiments, the leavened dough product can also include one or more non-dough products that can be included with the first and second dough components.

In certain embodiments, the non-dough products that can be included in the leavened dough product are selected from a filling product and a sauce product.

The filling product typically includes vegetables and/or proteins (such as meats or soy) and/or fruits that can be combined with first and second dough subcomponents to provide an additional nutritional aspect to the leavened dough product.

The sauce product typically includes spices or flavorings and other additive components that add flavor, texture, and/or color to the leavened dough product.

If included, the non-dough products are designed to withstand freezing in conjunction with the first and second dough subcomponents. Still further, the non-dough products are designed to withstand heat processing if combined with the dough having the desired degree of leavening as described above.

Methods for Forming Dough and Leavened Dough Products

To form the first dough subcomponent, the flour, salt, biological leavening activator and water and additional identified ingredients as described above are mixed and kneaded (i.e., combined) for an appropriate period of time to form a dough mixture. A glycol cooling system may be included to maintain an optimum dough temperature of 20° C., and high efficiency paddles may be utilized to reduce mixing time by as much as 10%. Once kneaded, the first dough subcomponent may be subdivided into appropriately sized pieces and rolled into balls and flattened to a desired thickness by rollers.

To form the second dough subcomponent, a similar process is used, in which the flour, leavening agent, water and additional identified ingredients as described above are mixed and kneaded (i.e., combined) for an appropriate period of time to form a dough mixture. A glycol cooling system may be included to maintain an optimum dough temperature of 20° C., and high efficiency paddles may be utilized to reduce mixing time by as much as 10%. Once kneaded, the second dough subcomponent may be subdivided into appropriately sized pieces and rolled into balls and flattened to a desired thickness by rollers.

The first and second dough subcomponents are available for immediate use, or alternatively may be frozen for later use. If frozen, it is desirable that a slow freezing process is utilized, in which the first and second dough subcomponents are placed into a −29 degree Fahrenheit freezer, which allows for a slow freezing rate.

The filling product may be formed in wide variety of methods, depending upon the actual ingredients included. For example, if vegetables and/or fruits are included, they may be pre-cut to a desired size and shape and washed. The vegetables and/or fruits may then be cooked to deactivate degradative enzymes and serve as a kill step for any possible bacterial contamination. Proteins such as meats can be cooked, while vegetable protein (TVP) such as soy can be reconstituted with 90° C. water. The vegetables, fruits and/or proteins can be mixed and are available for immediate use. Alternatively, the mixture can be frozen and inserted into a plastic pouch or other container for storage.

The sauce is produced by combining the ingredients in a jacketed mixing kettle according to a specific order: dry ingredients are added with the water first to ensure they dissolve and create an even mixture, and the additive such as xanthum gum and sesame oil can be added to the mixture to give the sauce a desired texture. The sauce is then cooked to ensure starch gelatinization and is available for immediate use. Alternatively, the sauce may be cooled inserted into appropriate packets for freezing and subsequent use.

In certain embodiments, the first and second dough components, and optionally the non-dough products, can be included in a meal kit. In the meal kit, the first and second dough components, and the non-dough products, are placed into a container. Preferably, the container includes separate compartments for sealingly and separately containing each of the first and second dough subcomponents and the non-dough product (and preferably with separate sealing compartments for each of the filling product and sauce product, when both are included). An exemplary meal kit is described in the Example below, although other configurations of meal kits are contemplated herein. The meal kit is typically maintained in a freezer prior to use, and such the first and second dough subcomponents and the non-dough products are typically in a frozen state prior to use.

To form the leavened dough product from the meal kit, the user first removes the meal kit from the freezer and allows the four components to thaw.

Once thawed, the user removes the first and second dough subcomponents from their sealed packaging. Next, the user combines the first and second dough subcomponents and works them together, such as by kneading, for a period of time sufficient to ensure a complete blending of the components to form a dough, such as about 3 minutes.

To make dumplings, the user rolls out the dough with a rolling pin and cuts it to a desired size. In the Example provided below, the meal kit includes a special dough sizing tool provided to allow the dough to be cut by the user to the appropriate size. To make the dumpling's filling, the user combines the filling product and sauce product to make a mixture and introduces the mixture into each dough wrapper (i.e., introduces the mixture into a pocket formed in the rolled out dough). Next, the user seals the pocket to contain the mixture of the sauce and filling product within the dough pocket to form a dumpling. Finally, the user introduces the sealed dumplings to a container containing a liquid such as water. The sealed dumplings are then boiled in the liquid for approximately 5-7 minutes to ensure that the sauce and filling product is heated to a desired temperature and to ensure that the temperature of the dough exceeds the viability temperature of the biological leavening activator, thereby terminating the fermentation process. The user then removes the heated dumplings from the container and cools them to a desired temperature for consumption. In alternative configurations, the dumpling's fillings could be made with only the sauce product or filling product as desired by the user. Still further, the dough could be boiled to form a dumpling without either of the sauce product or filling product as desired by the user. In still another alternative configuration, as opposed to boiling the dumplings, the dumplings can instead be pan-fried or otherwise heated in an oven or microwave to the desired temperature as described above.

To make pancakes, the user folds the filling product into the dough and the filled dough is rolled out so that the filling product is evenly dispersed throughout the dough to form a pancake. The user then introduces the pancake to a frying pan and pan-fries the pancake for approximately 2 to 3 minutes on each side on medium-low heat to achieve a crisp outer texture and to ensure that the temperature of the dough exceeds the viability temperature of the biological leavening activator to terminate the fermentation process as described above. The user then removes the pancake from the frying pan and cools the pancake to a desired temperature for consumption by a user. The fried pancake could be dipped into the sauce packet as desired by the user. In alternative configurations, the sauce packet could be mixed with the filling product and dough prior to the pan frying step as described above. Still further, the pancakes could be made without the filling product or without the sauce product as desired by the user. In still another alternative configuration, as opposed to pan frying the pancakes, the pancakes can instead be heated in an oven or microwave to the desired temperature as described above.

To make bao, the user allows the dough to proof for approximately 30 minutes to achieve the desired and full leavening effect, and the proofed dough is then divided into equal portions. The filling product and sauce product may then be mixed and introduced to fill each of the equal portions of the proofed dough. The filled equal portions of the dough are then steamed in a basket steamer for approximately 12 minutes to ensure that the temperature of the dough exceeds the viability temperature of the biological leavening activator to terminate the fermentation process as described above. In alternative configurations, only one, or the other, of the sauce packet or the filling product could be introduced to fill the proofed dough prior to steaming in the basket steamer as described above. Still further, the bao could be made without the filling product or sauce product as desired by the user. In still another alternative configuration, as opposed to steaming the bao, the bao could be formed by heating in an oven or microwave to the desired temperature as described above.

The present disclosure thus provides a user with a simple and repeatable method for forming leavened dough products having a desired degree of leavening. By forming the respective first and second dough subcomponents as separate subcomponents and storing the separate subcomponents in an uncombined state before use, the fermentation process that creates the leavening within the dough can be delayed until a user combines the first and second dough subcomponents. Still further, the separation of the dough into first and second dough subcomponents allows the separate subcomponents to be stored in a frozen state prior to use, with the frozen storing and the separation of the dough into two separate stored subcomponents performed to minimize metabolism of the biological leavening activator during the freezing or thawing process and maximize fermentation activity of the biological leavening activator after the freezing and thawing process. Even still further, the separation of the respective first and second dough subcomponents, and their respective viability (along with the non-dough components) to multiple freeze/thaw cycles allows a user to refreeze the first and second dough subcomponents, and associated meal kits, in instances where the user decides not to prepare the leavened dough products after thawing.

EXAMPLE

An Asian-style meal kit in accordance with an exemplary embodiment of the present disclosure is provided below and includes all of the components/ingredients that can be combined to make bao, pancakes or dumplings, with associated methods for each described below. In the Example, the biological leavening activator is yeast, and the leavening agent is sugar.

Meal Kit Preparation

The meal kit includes four separate components (the first and second dough subcomponents, the filling product, and the sauce product as provided in the Tables below) that are prepackaged in separate sealed containers and frozen.

The components described below were prepared separately and added to the box as it moves along a conveyor. Once filled, the container is sealed, passed through a metal detector, and transported to a −20° C. frozen storage for at least 8 hours where the kits await distribution.

Meal Kit Components

Packaging for Meal Kit

In the Example provided herein the meal kit included a specialty box designed to separately sealingly store each of the four separate components, with the box being capable of being placed in a freezer. In particular, the box was made of solid bleached sulfate paperboard that was coated with kaolin clay to withstand moisture while the four separate components were thawing. This recyclable material was selected because of its high printing quality and excellent tensile strength when folded (Paperboard Packaging Alliance). The box included a perforated opening on top for easy access, as well as a removable strip from one of the side panels, which easily folded into a sizing tool for making dumpling wrappers in the event that the user did not have an appropriately sized cup.

The plastic packaging used to contain the meal components was selected based on several functional properties. The material was vacuum-sealable, freezable, tolerable of submersion in hot water, and capable of providing good barrier protection to both oxygen and water. Polyethylene terephthalate (PET) film was utilized because it worked well at a large temperature range. While a single layer PET film doesn't have the oxygen barrier properties of a multilayer film, because the meal kit is intended to be frozen prior to use, the meal kit itself was not particularly susceptible to oxidation through the PET film. Additionally, PET film is recyclable while multilayer films are not, so the PET film was selected in the interest of sustainability and consumer appeal.

Food Components of Meal Kit

As noted above, the Asian-themed meal kit of this Example included four separate components that are separately sealingly contained within the meal kit packaging, including the first and second dough subcomponents, the filling product, and the sauce product. The formulations for each of these four separate components, as well as the methods for making these four separate components, are shown below:

| First Dough Subcomponent | | |
|---|---|---|
| Component | Weight (g) | Percent |
| Soft wheat pastry flour | 44.3 | 38.0% |
| All-purpose flour | 23.9 | 20.5% |
| Water | 38.2 | 32.8% |
| Yeast | 3.8 | 3.3% |
| Salt | 3.6 | 3.1% |
| Canola Oil | 2.7 | 2.3% |
| Ascorbic Acid | 0.001 | 0.001% |
| TOTAL | 117 | 100% |

| Second Dough Subcomponent | | |
|---|---|---|
| Component | Weight (g) | Percent |
| Soft wheat pastry flour | 137.4 | 40.8% |
| All-purpose flour | 72.9 | 21.7% |
| Water | 120.6 | 35.8% |
| Sugar (Second Leavening Agent) | 5.6 | 1.7% |
| Ascorbic acid | 0.0032 | 0.001% |
| TOTAL | 336 | 100% |

| Combined Dough | | | |
|---|---|---|---|
| Component | Weight (g) | Percent | Function |
| Soft wheat pastry flour | 137.4 | 40.11% | Product Structure, Stability and Elasticity |
| All-purpose flour | 117.2 | 21.36% | Product Structure, Stability and Elasticity |
| Water | 159.4 | 35.05% | Provides Moisture to Dissolve Components |
| Yeast | 3.8 | 0.84% | First Leavening Agent |
| Sugar | 5.6 | 1.24% | Second Leavening Agent Broken Down by First Leavening Agent via Fermentation Process |
| Salt | 3.6 | 0.79% | Yeast Inhibitor, Flavor Enhancer |
| Ascorbic Acid | 0.001 | 0.001% | Dough Conditioner |
| Canola Oil | 2.7 | 0.60% | Freezer Burn Protector |
| TOTAL | 453 | 100% | |

The first and second dough subcomponents were prepared simultaneously on separate lines. The second dough subcomponent combined the flour, sugar, ascorbic acid, and water in an offset tilt bowl mixer, where they were mixed and kneaded for 10 minutes. A glycol cooling system was included to maintain an optimum dough temperature of 20° C., and high efficiency paddles were utilized to reduce mixing time by as much as 10%. Once kneaded, the dough was emptied into a hopper atop a dough divider. As the dough passed through the bottom of the divider, 112 gram pieces fell onto a conveyor belt. The dough was then rolled into balls as it passed by the paddles along the belt and flattened to ½ inch thickness by rollers. Lastly, the second dough subcomponent was ejected onto vacuum sealable packaging three at a time, where it moved to a yeast dough ejector. At the same time, the first dough subcomponent containing the yeast, flour, ascorbic acid, salt, canola oil, and water was produced in an identical manner to the second dough subcomponent, however the first dough subcomponent was divided into smaller, 38 gram segments. Once both the first and second dough subcomponents were placed onto the plastic packaging film at least two inches apart, a second sheet of film was rolled over the top of the first and second dough subcomponents and a vacuum was used to seal the first and second dough subcomponents inside the plastic. A hot seal ring was made around the first and second dough subcomponents to adhere the plastic films to each other. Finally, the sealed first and second dough subcomponents in a sheet of three were placed in the box continuing along the conveyor.

| Filling Product | | |
|---|---|---|
| Component | Percent | Function |
| Carrots, Broccoli Stems, Radishes | 40.8% | Main Filling Component |
| Water | 35.8% | Rehydration agent for vegetable protein |
| Textured Vegetable Protein | 1.7% | Main protein source, texture |
| Green Onion | 0.001% | Flavor enhancer |
| TOTAL | 100% | |

The filling product's vegetables were pre-cut julienne-style and chloride-washed. The vegetables were steamed using a belt blanching table for 2 minutes to deactivate degradative enzymes and serve as a kill step for any possible bacterial contamination. The blanched vegetables were then transferred to a ribbon mixer. Separately, the dehydrated textured vegetable protein (TVP) was reconstituted in a paddle mixer with 90° C. water for 10 minutes. The rehydrated product was combined in the ribbon mixer at 20 RPM with the vegetables for 5 minutes. The mixture was transferred via a conveyor to an individual quick freezer (1QF) tunnel where it is frozen for 10 seconds before being inserted into a sheet of plastic sachets. Each pouch was sealed individually, and a perforation was made in between each. The line of pouches was cut into triplets and a sheet of three was added to each meal kit. The frozen filling addition was the last step before package folding, metal detection, and frozen storage to ensure contents remain frozen before use.

The vegetables used in the filling product were not only chosen to complement the sauce and dough, but also based on their ability to stand up to the freeze-thaw cycle they would endure. Carrots, broccoli stalks, and radishes hold onto their water content the best after being blanched, frozen, and thawed in trials. There was still, however, a slight amount of free water after thawing. This was addressed by under-hydrating the TVP during formulation, which allowed it to take in any free moisture produced during the thawing of the vegetable portion of the filling product.

| Sauce Product | | |
|---|---|---|
| Component | Percent | Function |
| Low Sodium Soy Sauce | 53.62% | Flavor and body |
| Brown sugar | 31.42% | Flavor and texture |
| Chili paste | 3.98% | Flavor |
| Rice wine vinegar | 3.14% | Flavor |
| Water | 3.14% | Moisture Provider |
| Garlic powder, black pepper | 1.78% | Spice |
| Modified corn starch | 1.68% | Thickener |
| Sesame oil | 1.05% | Flavor and Body |
| Xanthan gum | 0.2% | Flavor and Texture |
| TOTAL | 100% | |

The sauce is produced by combining the ingredients in a jacketed mixing kettle according to a specific order: dry ingredients are added with the water first to ensure they dissolve and create an even mixture, and the xanthan gum is added in a sesame oil slurry to prevent clumping that would affect sauce texture. The sauce is cooked to a minimum of 90° C. for 5 minutes to ensure starch gelatinization (Lopez and others 2010). After cooling to 38° C., the sauce is sealed in connected sachets, and quickly refrigerated after final packaging.

Freeze-Thaw Stability

Freeze-thaw stability is an important factor in determining a shelf life of a product. Because there is a distinct possibility that a user may leave remove the meal kit from a freezer and keep the meal kit at room temperature for hours return it to a freezer, studies were conducted to confirm the continued viability of the meal kit. Specifically, the frozen meal kit of this example was exposed to four freeze-thaw cycles. In each cycle, the test samples were frozen for 20 hours, then left at room temperature for 4 hours, and returned to a freezer. The yeast viability, appearance of the filling product and the sauce product, the workability of the dough, and the taste of the final products were each evaluated. The results showed that, even after 4 freeze-thaw cycles, the dough still yielded a 50% increase in volume which meets our minimum standard of viability. Samples from the last two cycles did suffer slightly in regard to workability of the dough, but the taste of final products was not impacted.

Preparation of Leavened Dough Products (Dumplings, Pancakes, Bao)

To form the leavened dough product from the meal kit, the user first removes the meal kit from the freezer and allows the four components to thaw.

Once thawed, remove the first and second dough subcomponents from their sealed packaging. Next, combine the first and second dough subcomponents and work together, such as by kneading, for 3 minutes, to form the dough.

To make dumplings, the dough was rolled out with a rolling pin and cut to size. In the example provided, the meal kit includes the special dough sizing tool provided to allow the dough to be cut to the appropriate size. To make the dumplings' filling, the filling product and sauce product were combined and introduced into each wrapper (i.e., introduced into a pocket formed in the rolled out dough). Next, the pocket was sealed to contain the mixture of the sauce and filling product within the dough to form a dumpling. Finally, the sealed dumplings were introduced to a container containing a liquid such as water. The sealed dumplings were then boiled in the liquid for approximately 5-7 minutes to ensure that the sauce and filling product was heated to a desired temperature and to ensure that the temperature of the dough exceeded the viability temperature of the yeast to terminate the fermentation process. The heated dumplings were then removed from the container and cooled to a desired temperature for consumption by a user. In alternative configurations, the dumpling's fillings could be made with only the sauce product or filling product as desired by the user. Still further, the dough could be boiled to form a dumpling without either of the sauce or filling product as desired by the user. In still another alternative configuration, as opposed to boiling the dumplings, the dumplings can instead be pan-fried or otherwise heated in an oven or microwave to a desired temperature as described above.

To make pancakes, the filling product was folded into the dough and the dough was rolled out so that the filling product was evenly dispersed throughout the dough to form a pancake. The pancake was then introduced to a frying pan and pan-fried for approximately 2 to 3 minutes on each side on medium-low heat to achieve crisp outer texture and to ensure that the temperature of the dough exceeded the viability temperature of the yeast to terminate the fermentation process. The pancake was removed from the frying pan and cooled to a desired temperature for consumption by a user. The pancake could be dipped into the sauce packet as desired by the user. In alternative configurations, the sauce packet could be mixed with the filling product and dough prior to the pan frying step above. Still further, the pancakes could be made without the filling product or sauce product as desired by the user. In still another alternative configuration, as opposed to pan frying the pancakes, the pancakes can instead be heated in an oven or microwave to the desired temperature as described above.

To make bao, the dough was allowed to proof for approximately 30 minutes to achieve the desired and full leavening effect, and the proofed dough was then divided into equal portions. The filling product and sauce product were mixed and introduced to fill each of the equal portions of the proofed dough. The filled equal portions of the dough were then steamed in a basket steamer for approximately 12 minutes to ensure that the temperature of the dough exceeded the viability temperature of the yeast to terminate the fermentation process. In alternative configurations, only one, or the other, of the sauce packet or filling product could be introduced to fill the proofed dough prior to steaming as described above. Still further, the bao could be made without the filling product or sauce product as desired by the user. In still another alternative configuration, as opposed to steaming the bao, the bao could be formed by heating in an oven or microwave to the desired temperature as described above.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method for forming a leavened dough product, said method comprising:
   forming a first dough subcomponent yeast, flour, salt and water, wherein the concentration of salt in the first dough subcomponent is is in the range of 2.5% to 10% by weight based on the total weight of the first dough component;
   forming a second dough subcomponent comprising sugar, flour, and water;

combining the first and second dough subcomponents for a period of time sufficient to allow the sugar to react in the presence of the yeast through a fermentation process to form a dough having a desired degree of leavening;

and heat processing the dough having the desired degree of leavening to a temperature exceeding a viability temperature of the yeast and terminating the fermentation process; wherein the method comprises a step of storing the first dough subcomponent for a period of time prior to the step of combining the first and second dough subcomponents, wherein the step of storing the first dough subcomponent further comprises a step of freezing the first dough subcomponent, and wherein the step of combining the first and second dough subcomponents further comprises thawing the first dough subcomponent and combining the first dough subcomponent after the step of thawing, with the second dough subcomponent.

2. The dough of claim 1, wherein the concentration of salt in the dough is 0.5% to 3% by weight based on the total weight of the dough formed by combining the first and second dough components.

3. The method of claim 1 further comprising the step of:
combining at least one non-dough product with the dough having the desired degree of leavening prior to said step of heat processing the dough having the desired degree of leavening to a temperature sufficient to terminate the fermentation process,
wherein the at least one non-dough product is selected from a group consisting of a filling product and a sauce product.

4. The method of claim 3, wherein said steps of combining the at least one non-dough product with the dough and heat processing the dough comprises:
forming a pocket within the dough having the desired degree of leavening;
introducing the at least one dough product within the pocket;
forming a dumpling by sealing the pocket such that the at least one dough product is contained within the pocket of the dough;
heating the dumpling to a temperature sufficient to terminate the fermentation process in the dough.

5. The method of claim 4, wherein said step of heating the dumpling comprises:
introducing the dumpling to a container containing a liquid; and
heating the dumpling within the liquid to a temperature sufficient to terminate the fermentation process in the dough.

6. The method of claim 3, wherein said steps of combining the at least one non-dough product with the dough and heat processing the dough comprises:
combining the at least one non-dough product with the dough to form pancake;
frying the pancake to a temperature sufficient to terminate the fermentation process in the dough.

7. The method of claim 3, wherein said step of heat processing the dough comprises:
steaming the dough having the desired degree of leavening to a temperature exceeding a viability temperature of the yeast and terminating the fermentation process.

8. The method of claim 1, further comprising a step of combining at least one non-dough product with the dough having the desired degree of leavening to form a combined product, wherein the at least one non-dough product is selected from a group consisting of a filling product and a sauce product; and wherein said step of heat processing the dough comprises: steaming the combined product to a temperature exceeding a viability temperature of the yeast and terminating the fermentation process to form bao.

* * * * *